Jan. 22, 1946.    N. M. BERLIN    2,393,282
ICE AUGER
Filed Aug. 14, 1944
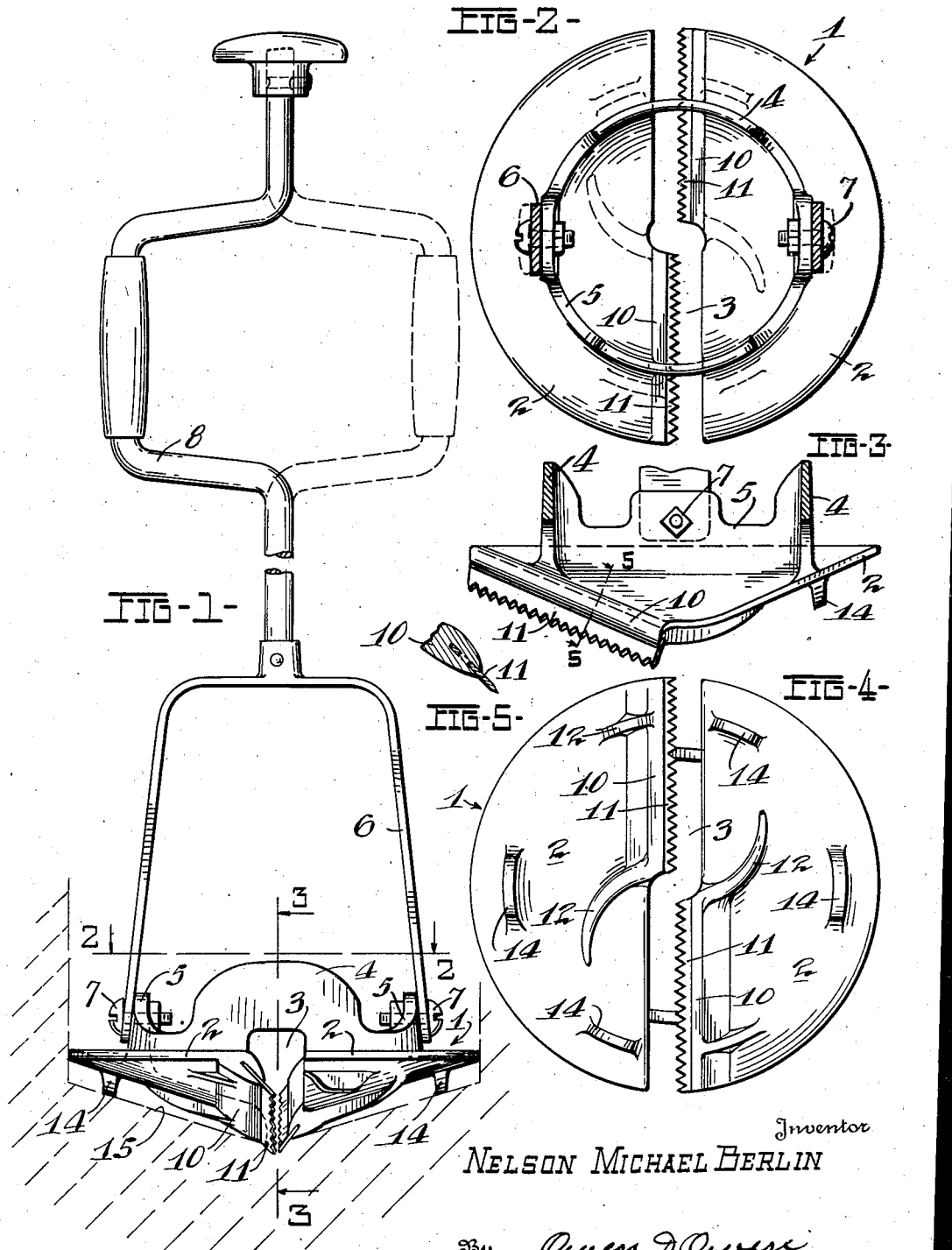
Inventor
NELSON MICHAEL BERLIN Patented Jan. 22, 1946

2,393,282

UNITED STATES PATENT OFFICE 2,393,282

ICE AUGER

Nelson Michael Berlin, Pittsford, Mich., assignor of one-third to Robert R. Hoover, Hillsdale, Mich., and one-third to Parris B. Beery, Hudson, Mich.

Application August 14, 1944, Serial No. 549,461

2 Claims. (Cl. 255—70)

This invention relates to boring tools and particularly to a hand tool of this type adapted to bore holes in ice suitable for fishing through.

The primary object of the invention is a simple and efficient ice boring auger which has improved features to facilitate boring and to enhance the practicability and commercial value thereof.

The invention is fully described in the following specification and a preferred embodiment thereof illustrated in the accompanying drawing, in which:

Fig. 1 is a side elevation of a tool embodying the invention, with a part broken away; Fig. 2 is a cross-section on the line 2—2 in Fig. 1; Fig. 3 is a section on the line 3—3 in Fig. 1; Fig. 4 is a bottom view of the tool, and Fig. 5 is a section on the line 5—5 in Fig. 3.

Referring to the drawing, 1 designates the boring head of the tool and comprises two duplicate half circular segmental sections 2, 2 with a diametrical space 3 therebetween. These sections are rigidly connected together adjacent to each end of said space by bridging flanges or parts 4 formed on the top sides of the sections. The parts 4 preferably constitute portions of a circular reinforcing flange 5 rising from the tops of the head sections, and which, at diametrically opposite sides of the space 3 and centrally of each section, provides an ear or attaching part for the respective leg of a brace yoke 6. In the present instance each yoke leg is attached to its part by a bolt 7. The yoke 6 is centrally attached to and forms the inner end portion of a hand brace 8.

The head is tapered outwardly and upwardly at a slight angle from a central point, as shown, so as to render the head substantially conical at top and bottom. This not only enables the cutting edges, hereinafter described, to lengthwise stand at an incline to a plane normal to the head axis, but also gives the top of the head a dished form for receiving ice chips and diggings as the cutting progresses, and facilitates their removal from the hole by lifting the head therefrom.

The tool in cutting a hole is intended to be turned in counter-clockwise direction, and the leading half of the inner edge of each section is provided on the bottom side of the section with a rib or enlargement 10 holding a cutting blade 11 which projects outwardly on an incline toward the center radial line of the space 3 with its cutting edge terminating substantially at such line and parallel, or substantially so, to the conical taper of the head. The ribs 10 are preferably cast around the inner edge portion of the blades to firmly hold them to the head, and each rib is preferably braced or reinforced by ribs 12 extending rearwardly therefrom and formed integral therewith and with the body portion of the respective head section. The cutting edge of each blade 11 is preferably serrated or of saw-tooth form to facilitate cutting.

The head 1 is provided on its bottom side with a plurality of depth control lugs 14, in the present instance four in number, disposed near the outer edge of the head and in substantially equidistantly spaced relation therearound, with two on each head section. These lugs rest on the inclined bottom surface 15 of the hole being dug and not only serve to prevent a rocking of the tool in the hole so as to insure the digging of a straight hole, but also serve as depth gauges for the cut or bite of the cutting blades, as indicated.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In an ice auger, a circular cutter head having a substantially conical bottom surface and comprising two segmental sections spaced along a diametrical line to form a slot therebetween, and each having a cutting blade along the edge wall of said slot which is leading in the direction of intended turning of the head, said blade projecting outwardly from said edge on an incline toward the center radial line of the slot with its cutting edge terminating adjacent to such line and substantially parallel to the conical taper of the head, a circular flange projecting upward from the top side of the head in inwardly spaced relation to its outer edge concentric thereto and rigidly connecting the head sections by bridging the slot therebetween, an inverted U-shaped yoke rising from said head and having its leg terminals fixedly connected in diametrically opposed relation to said flange at opposite sides of the head center and at points intermediate the slot bridging portions of the flange, and a hand brace centrally connected to the upper loop end of said yoke and operable to effect a turning of the yoke and head.

2. In an ice auger, a circular cutter head having a conical bottom surface and having a plurality of radial slots disposed equidistantly therearound, a cutting blade attached to and extending along the edge wall of each slot that is leading in the direction of intended turning of the head, said blade projecting outwardly from said edge on an incline toward the center radial line of the slot with its cutting edge terminating adjacent to such line and substantially parallel to the conical taper of the head, a circular flange fixedly projecting upwardly from the top side of the head concentric to its turning axis and bridging said slots adjacent to their outer ends, an inverted U-shaped yoke over said head having its leg terminals fixedly connected in diametrically opposed relation to said flange at opposite sides of the head center, and a hand brace centrally connected to the upper loop end of said yoke and operable to effect a turning of the yoke and head.

NELSON MICHAEL BERLIN.